(12) United States Patent
Yoshimura et al.

(10) Patent No.: US 7,981,567 B2
(45) Date of Patent: Jul. 19, 2011

(54) POLYMER HAVING OXOCARBON GROUP, AND USE THEREOF

(75) Inventors: Ken Yoshimura, Tsukuba (JP); Lanny S. Liebeskind, Atlanta, GA (US)

(73) Assignee: Sumitomo Chemical Company, Limited, Tokyo (JP)

( * ) Notice: Subject to any disclaimer, the term of this patent is extended or adjusted under 35 U.S.C. 154(b) by 792 days.

(21) Appl. No.: 11/926,674

(22) Filed: Oct. 29, 2007

(65) Prior Publication Data
US 2009/0110994 A1    Apr. 30, 2009

(51) Int. Cl.
- *H01M 8/10* (2006.01)
- *C08F 12/30* (2006.01)
- *B01J 49/00* (2006.01)

(52) U.S. Cl. .......... 429/492; 526/286; 526/309; 521/25

(58) Field of Classification Search .......... 429/33, 429/314, 492; 521/25; 526/286, 309
See application file for complete search history.

(56) References Cited

U.S. PATENT DOCUMENTS

| 5,403,675 A | 4/1995 | Ogata et al. |
| 5,438,082 A | 8/1995 | Helmer-Metzmann et al. |
| 6,004,698 A * | 12/1999 | Richardson et al. .......... 429/305 |
| 6,743,877 B1 * | 6/2004 | Armand et al. ............... 526/258 |

FOREIGN PATENT DOCUMENTS

| JP | 2003-277501 A | 10/2003 |
| JP | 2006-225624 A | 8/2006 |

OTHER PUBLICATIONS

R. Nolte et al., "Partially sulfonated poly(arylene ether sulfone)—A versatile proton conducting membrane materials for modern energy conversion technologies", Journal of Membrane Science, 83, (1993), pp. 211-220.
H. Allcock et al., "Sulfonation of (Aryloxy)—and (Arylamino) phosphazenes: Small-Molecule Compounds, Polymers, and Surfaces", Chemical Materials, 3, (1991), pp. 1120-1132.
R. West, "Oxocarbons", Academic Press, (1980), pp. 45.
E. Patton et al., "New Aromatic Anions. X. Dissociation Constants of Substituted Oxocarbon Acids", Journal of the American Chemical Society, 95, (1973), pp. 8703-8707.

\* cited by examiner

*Primary Examiner* — Michael M Bernshteyn
(74) *Attorney, Agent, or Firm* — Sughrue Mion, PLLC

(57) ABSTRACT

The present invention provides a novel polymer composed of polyarylene in the main chain and having oxocarbon groups which is particularly useful in battery and fuel cell applications.

10 Claims, No Drawings

POLYMER HAVING OXOCARBON GROUP, AND USE THEREOF

FIELD OF THE INVENTION

This invention relates to a novel polymer composed of polyarylene in the main chain and having oxocarbon groups. The polyarylenes having oxocarbon groups are particularly useful in battery and fuel cell applications.

BACKGROUND OF THE INVENTION

It is well known that polymers having sulfonic acid group are useful for a polymer electrolyte to be applied to polymer electrolyte membrane fuel cells and the like. The following polymers, for example, are proposed as a polymer electrolyte to be applied to polymer electrolyte membrane fuel cells and the like: polymers introducing sulfonic acid group into fluorine-containing polymers, typically being Nafion (a trade name of DuPont Co., Ltd.); polymers introducing sulfonic acid group into poly(ether ketone)s (U.S. Pat. No. 5,438,082); polymers introducing sulfonic acid group into poly(ether sulfone)s (J. Membrane Science, 83, 211 (1993)); polymers introducing sulfonic acid group into polyimides (Kokai (Japan unexamined patent publication) No. 2003-277501); polymers introducing sulfonic acid group into polyphenylenes (U.S. Pat. No. 5,403,675); and polymers introducing sulfonic acid group into polyphosphazenes (Chemical Material, 3, 1120, (1991)).

On the other hand, oxocarbons, for example squaric acid, croconic acid and the like, are known as high acidic functional groups due to a stable resonated structure dissociating hydrogen atom from the oxocarbon group (Oxocarbons, page 45 (Edited by Robert West), Academic Press (1980), (ISBN:0-12-744580-3); Journal of the American Chemical Society, 95, 8703 (1973)). Recently polymers having oxocarbon groups instead of sulfonic acid groups are proposed as a polymer electrolyte (Kokai (Japan unexamined patent publication) No. 2006-225624).

DISCLOSURE OF THE INVENTION

The chemical stability of the polymers having oxocarbon groups is not satisfactory due to poly(ether sulfone)s in the main chain.

The creators of the invention have found that the polymer composing of a polyarylene in the main chain and having oxocarbon groups showed better chemical stability and is useful for a polymer electrolyte which is an ingredient of proton conductive membrane for polymer electrolyte membrane fuel cells which use gaseous fuels such as hydrogen gas or liquid fuels such as methanol and dimethylether, and thus accomplished the present invention.

The invention provides

[1] a polymer having an oxocarbon group represented by the following formula (1)

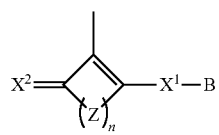

(wherein $X^1$ and $X^2$ independently represent —O—, —S—, or —NR—, and Z represents —CO—, —C(S)—, C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom); and having polyarylenes in the main chain.

The invention further provides:

[2] the polymer according to the above-described [1], wherein the polyarylenes have the structure represented by following formula (2)

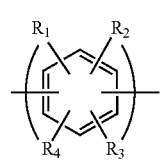

(wherein $R_1$-$R_4$ are substitutional groups or H and m is 6 or greater)

[3] the polymer according to the above-described [1] or [2], wherein $R_1$ is benzoyl group or its derivatives.

[4] the polymer according to the above-described [1] to [3], wherein Z is selected from the group consisting of —CO—, —C(S)—, and —C(NR)—;

[5] the polymer according to the above-described [1] or [4], wherein $X^1$ and $X^2$ are —O-s, Z is —CO—, and n is 0 to 2;

[6] a polymer electrolyte including the polymer as an effective component according to any one of the above-described [1] to [5];

[7] a polymer electrolyte membrane including the polymer electrolyte according to the above-described [6];

[8] a catalytic composition including the polymer electrolyte according to the above-described [6];

[9] a polymer electrolyte membrane-electrode assembly including any one of the polymer electrolyte according to the above-described [6], the polymer electrolyte membrane according to the above-described [7], or the catalytic composition according to the above-described [8]; and

[10] a polymer electrolyte membrane fuel cell including any one of the polymer electrolyte according to the above-described [6], the polymer electrolyte membrane according to the above-described [7], the catalytic composition according to the above-described [8], or the polymer electrolyte membrane-electrode assembly according to the above-described [9];

[11] an iodinated polyarylene;

[12] the polymer according to the above-described [11], wherein the polyarylene is a poly(aryloxybenzoylphenylene);

[13] the polymer according to the above-described [12], wherein the poly(aryloxybenzoylphenylene) is a poly(4-phenoxybenzoyl-1,4-phenylene).

BEST MODE FOR CARRYING OUT THE INVENTION

The detail of the invention is explained as follows.
The polymer of the invention has an oxocarbon group represented by the following formula (1)

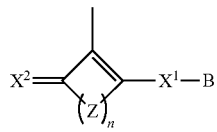
(1)

(wherein $X^1$ and $X^2$ independently represent —O—, —S—, or —NR—, and Z represents —CO—, —C(S)—, C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom); and having polyarylenes in the main chain.

$X^1$ and $X^2$ independently represent —O—, —S—, or —NR—; preferably —O— or —S—, and particularly preferably —O—.

The R of NR represents hydrogen atom, alkyl groups with carbon number of 1 to 6 such as methyl group, trifluoromethyl group, ethyl group, propyl group, isopropyl group, and n-butyl group, or aryl groups with carbon number of 6 to 10 such as phenyl group, pentafluorophenyl group, and naphthyl group. These alkyl group and aryl group may have substitution groups.

The Z represents —CO—, —C(S)—, —C(NR')—, alkylene group which may have substitution groups, or arylene group which may have substitution groups. The R' of NR' has the same meaning mentioned above.

Typical examples of the alkylene groups include alkylene groups with carbon number of 1 to 6 such as methylene, fluoromethylene, difluoromethylene, phenylmethylene, and diphenylmethylene. Typical examples of the arylene groups which may have substitution groups include arylene groups with carbon number of 6 to 10 such as phenylene group, naphtylene group, and tetrafluorophenylene group.

The Z is preferably —CO—, —C(S)—, or —C(NR')—; more preferably —CO—, or —C(S)—; and particularly preferably —CO—.

The n is a repeating number of Z and represents an integer of 0 to 10. When n is two or more, n Z-groups may be same or different from each other. The n is preferably 0 to 4, more preferably 0 to 2, and particularly preferably 1.

The B represents a hydrogen atom or a monovalent metal atom. The monovalent metal includes lithium atom, sodium atom, potassium atom, cesium atom, silver atom, and the like. The B preferably includes hydrogen atom, lithium atom, and sodium atom; more preferably hydrogen atom and lithium atom; and particularly preferably hydrogen atom.

Ion exchange capacity means the number of moles of the cation exchange group per 1 gram of polymer in this invention. The ion exchange capacity can be determined by the equation below.

(Number of moles of cation exchange group in the polymer,mol)/(Number of grams of the polymer, g)×1000=(Ion exchange capacity,meq/g)

According to the book of reference (Oxocarbons, page 12 (Edited by Robert West), Academic Press (1980), (ISBN:0-12-744580-3)), the structure having NR or S instead of O in oxocarbons is called pseudo-oxocarbons. In this invention, the structure represented by the formula (1) is called oxocarbon group even if the structure represented by the formula (1) does not include any oxygen atoms.

Preferable oxocarbon groups are exemplified as follows:

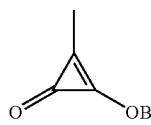
(1a)

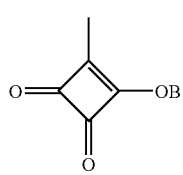
(1b)

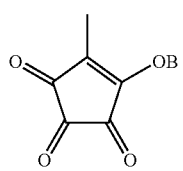
(1c)

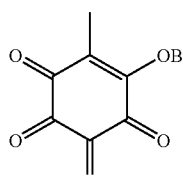
(1d)

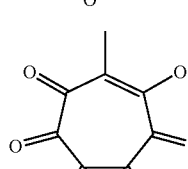
(1e)

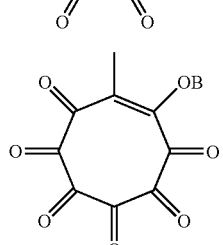
(1f)

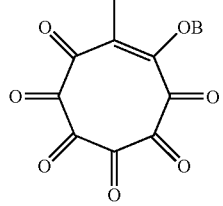
(1g)

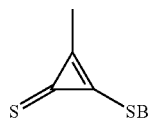
(1h)

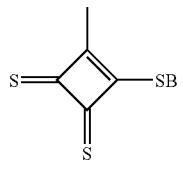
(1i)

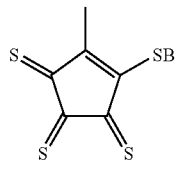

(1j)
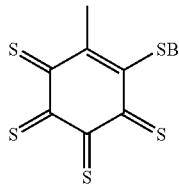

(1k)
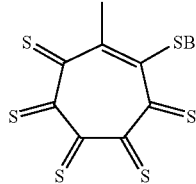

(1l)
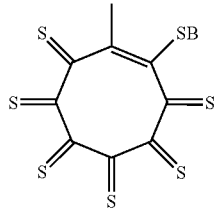

(1m)
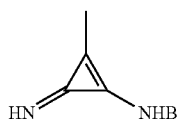

(1n)
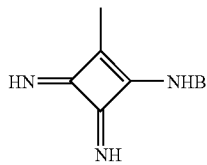

(1o)
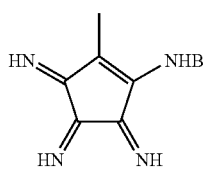

(1p)
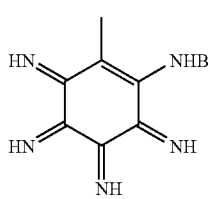

(1q)
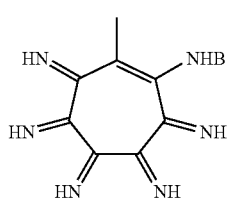

(1r)
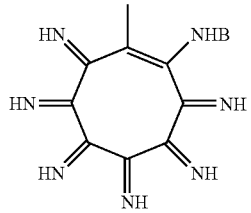

Among above examples, preferable oxocarbon groups are (1a) to (1d); more preferable oxocarbon groups are (1a) to (1c), much more preferable oxocarbon groups are (1b) to (1c), and most preferable oxocarbon group is (1b).

The oxocarbon group may be in a form of free acid as B being hydrogen atom or salt as B being a monovalent metal atom. The polymer having the oxocarbon group of the invention may be composed of repeating units all of which are coupled with an oxocarbon group or some of which are not coupled with an oxocarbon group. The repeating unit may be coupled with two or more of oxocarbon groups. The oxocarbon groups coupled to the repeating units of the polymer may be same or different from each other, or the B in the formula (1) may be hydrogen atom or a monovalent metal atom. When being used as an component of polymer electrolyte membrane fuel cells, in view of power generation ability, all of oxocarbon groups coupled to the repeating units are preferably substantially in a form of free acid.

The monovalent metal atom is preferably lithium atom, sodium atom, or potassium atom; more preferably lithium atom or sodium atom; and particularly preferably lithium atom.

The polymer of the invention is characterized by having an oxocarbon group represented by the formula (1) and having repeating units composing of polyarylene in the main chain.

The polyarylenes of the present invention are polymers composed of aromatic rings and covalent bonds between their aromatic rings. The monomer units are not necessarily in a straight line. In some polymers, the majority of monomer units will be in a straight line (see below A). In other polymers, the monomer units will be staggered in a stair-like or crankshaft-like fashion (see below B).

(A)
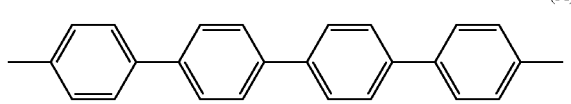

(B)
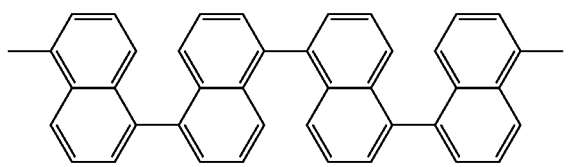

(The chain A and B monomer units are shown schematically without pendant groups.)

Preferably, the polyarylenes of the present invention are represented by following formula (2)

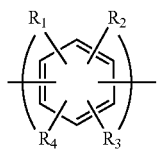

(2)

(wherein $R_1$-$R_4$ are substitutional groups or H and m is 6 or greater)

The substitutional groups $R_1$-$R_4$ may be chosen from a wide variety of functional groups, including but not limited to alcohol, aldehyde, alkaryl, alkoxy, alkyl, alkyl or aryl amide, alkyl ketone, alkyl sulfide, alkylsulfonate, alkylsulfonic acid, amide, amine, aralkyl, aryl, aryl ester, arylether, aryletheretherketone, aryletherketone, arylketone, aryloxy benzoyl, aryloxy, arylsulfide, arylsulfonate, arylsulfone, arylsulfonic acid, arylsulfoxide, benzoyl, carboxylic acid, ester, fluoro or polyfluoroalkyl, fluoro or polyfluoroalkyl, heteroaryl, imide, imine, ketone, naphthyl, naphthoyl, phenoxybenzoyl, phenyl, sulfonamide, sulfonate, sulfone, sulfonic acid, —CH(OH)—Ar, —CH(OH)—Ar'—O—Ar, —COOAr, —CO—Ar'—O—Ar, —OCOAr, and the like, wherein —Ar is an aryl group and —Ar'— is an arylene group. The composition of the polyarylenes may have two or more different R1-R4 groups. The R groups may also be oligomeric or polymeric, for example, but not limited to poly(phenylene oxide), poly (ether ketone), poly(ether ether ketone), poly(phenylene sulfide), poly(ethylene oxide), and the like.

A polyarylene having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below, wherein m represents the number of repeatings. In the following structures, (A-1)-(A-10), the repeating unit may have a substitution groups.

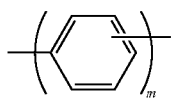

(A-1)

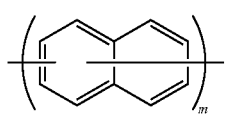

(A-2)

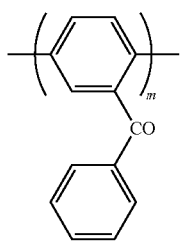

(A-3)

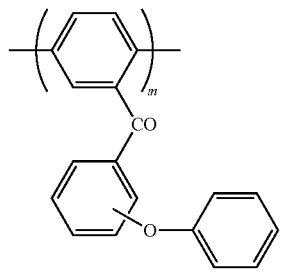

(A-4)

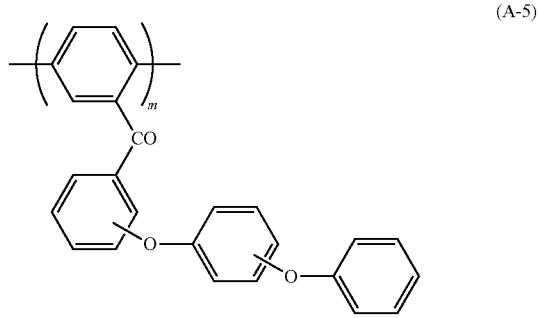

(A-5)

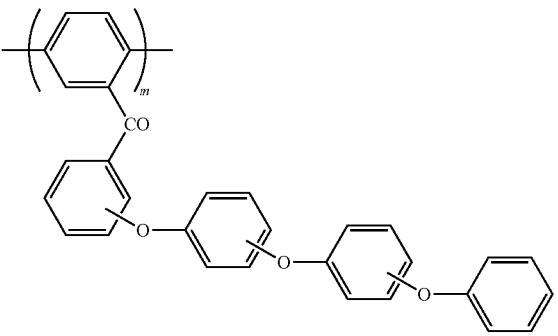

(A-6)

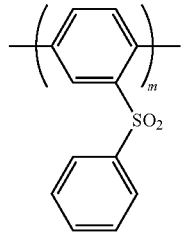

(A-7)

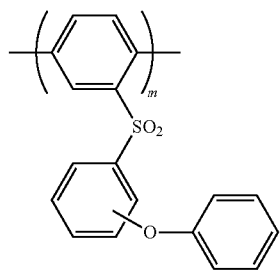

(A-8)

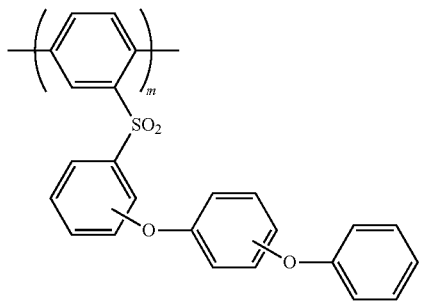

(A-9)

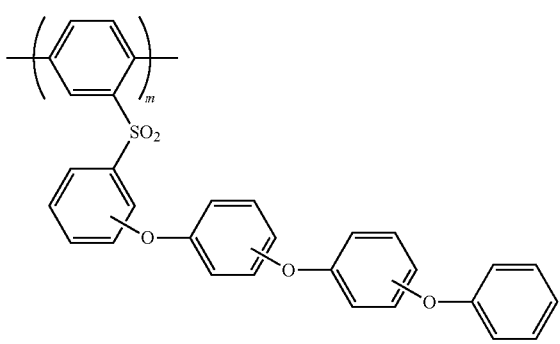

(A-10)

The number of oxocarbon groups coupled to the repeating unit exemplified above may be one or two or more. The oxocarbon groups coupled to the repeating unit may be same or different from each other. The oxocarbon groups may be coupled with not all of the repeating units present in a polymer.

The polymer of the invention, of which structures are exemplified above, does not have any particular limit in the molecular weight thereof, the molecular weight thereof preferably being about 5000 to about 1000000, more preferably being about 10000 to about 500000, and particularly preferably being about 20000 to about 300000. If being less than 5000, it tends to be difficult to retain a form of membrane when the polymer is used as a membrane, and if being 1000000 or more, it tends to be hard to mold in a membrane shape.

The polymer of this invention has an ion exchange capacity of 0.5 meq/g or above. The polymer of the invention preferably has an ion-exchange capacity of 1.0 meq/g or above. If the polymer has less than 0.5 meq/g, it tends to be unfavorable in view of proton conductivity.

A method for producing the polymer of the invention is explained.

The method for producing the polymer of the invention includes:
(A) a method of introducing an oxocarbon group represented by the formula (1) in a polymer;
(B) a method of polymerizing a monomer including an oxocarbon group represented by the formula (1); and the like.

Any of the methods (A) and (B) can be carried out by the following methods:
(I) a method of synthesizing an aliphatic compound or aromatic compound having a group represented by the formula (1) with using a lithium reagent (Journal of Organic Chemistry, 53, 2482, 2477 (1988));
(II) a method of synthesizing an aliphatic compound or aromatic compound having a group represented by the formula (1) with using a Grignard reagent (Heterocycles, 27(5), 1191 (1988));
(III) a method of synthesizing an aliphatic compound or aromatic compound having a group represented by the formula (1) with using a tin-oxocarbon derivatives (described in Journal of Organic Chemistry, 55, 5359 (1990), Tetrahedron Letters, 31(30), 4293 (1990)); and
(IV) a method of synthesizing an aromatic compound having a group represented by the formula (1) with a Friedel-Crafts reaction (Synthesis, page 46 (1974)).

Explained as follows is the method (A) and (III) that a polymer is introduced with an oxocarbon group represented by the formula (1), specifically that a polymer having a repeating unit of arylene is introduced with a group of which structure in the formula (1) is defined with $X^1=X^2=-O-$, $Z=-CO-$, and n=1. Included is a method (III) that a polymer having a halogenated arylene as a repeating unit thereof can be reacted with 4-alkoxy-3-(trialkyl stannyl)cyclobut-3-ene-1,2-dione in the presence of transition metal catalysts, followed by treated under an acidic condition.

Process for preparing the polymer having arylene are described in U.S. Pat. No. 5,403,675 in which the polymer was synthesized using halogen-halogen coupling with nickel catalysts. The polymer having arylene may be also synthesized by oxidative polymerization (T. Okada, T. Ogata, M. Ueda, Macromolecules, 1996, 29(24), 7645-7650; K. Tsuchiya, Y. Shibasaki and M. Ueda, Polymer, 2004, 45(20), 6873-6878) and the like.

The polymer having a halogenated arylene as a repeating unit may be synthesized by halogenation of polyarylenes. Preferable halogen is bromide and iodine.

Bromine atom can be introduced into the polyarylenes using bromine. Catalysts, for example iron, iron bromide and the like, may be used if the bromine is difficult to be introduced. The polymers having a brominated arylene as a repeating unit are exemplified by polymers having the following repeating units, wherein m represents the number of repeatings; p, q, r represent the number of 0-2; s represents the number of 0-3. In the following structures, (B-1)-(B-10), the repeating unit may have substitution groups.

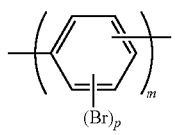

(B-1)

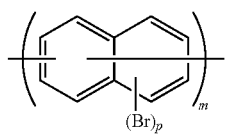

(B-2)

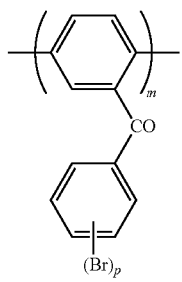

(B-3)

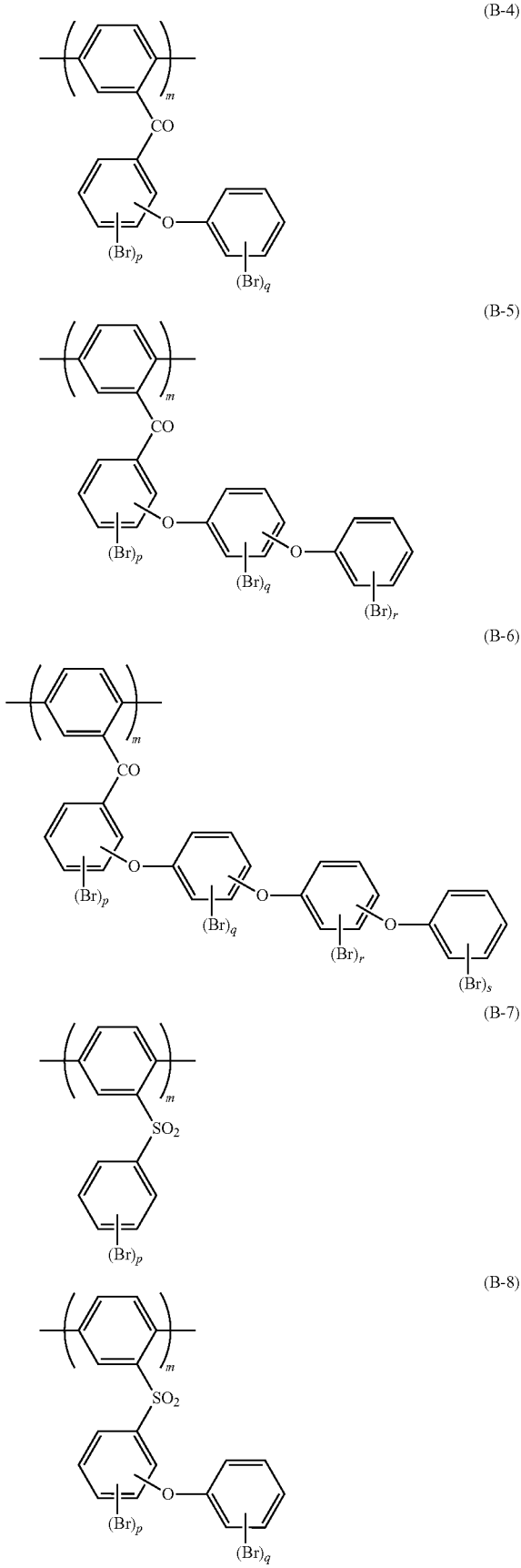
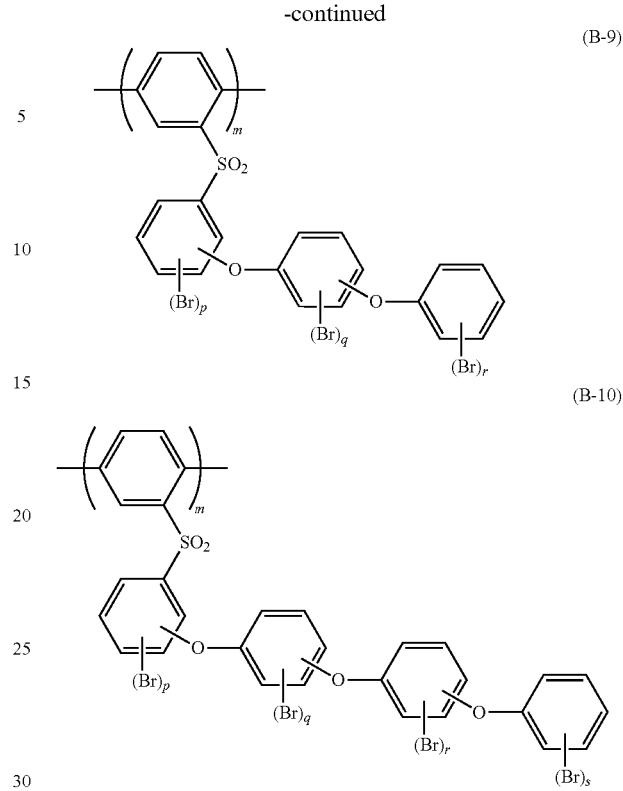

Among polymers mentioned above, preferable halogenated polyarylenes are (B-1) to (C-4), more preferable halogenated polyarylenes are (B-1) to (B-4), and most preferable halogenated polyarylene is (B-2).

Aryl bromide can be converted into aryl iodide of higher reactivity using Finkelstein reaction reported in A. Klapars and S. L. Buchwald, Journal of the American Chemical Society, 2002, 124, 14844-14845. In the literature mentioned above, it was reported that bromized low molecular weight compound could be convert into iodinated compound. The creators of the invention have found that the Finkelstein reaction could have been incorporated into high molecular weight compound such as aromatic polymer including polyarylene. In the Finkelstein reaction, multi dentate amine, transition metal iodide and alkali metal iodide are used as a reagent.

The multi dentate amine includes 1,2-ethylenediamine, 1,3-propylenediamine, N,N'-dimethylethylenediamine, N,N'-dimethylpropylenediamine, N,N'-dimethylcyclohexanediamine, N,N,N',N'-tetramethylethylenediamine, N,N,N',N'-tetramethylpropylenediamine, N,N,N',N'',N''-pentamethyldiethylenetriamine, N,N,N',N'',N''',N'''-hexamethyltriethylenetetramine, N,N'-dimethylcyclohexane-1,2-diamine, N,N,N',N'-tetramethylcyclohexane-1,2-diamine, and the like.

Among multi dentate amines mentioned above, N,N'-dimethylcyclohexane-1,2-diamine is preferably used, rac-trans-N,N'-dimethylcyclohexane-1,2-diamine is more preferably used. The multi dentate amine is used 0.1-100 mol % to the bromine atom in the precursor polymer, preferably 0.2-50%, more preferably 0.3-10%, most preferably 0.4-5%.

The transition metal iodide includes copper iodide, iron iodide, nickel iodide, and the like. Preferably, copper iodide and iron iodide are used, more preferably copper iodide is used, most preferably copper (I) iodide is used. The transition metal iodide is used 0.1-100 mol % to bromine atom in the precursor polymer, preferably 0.2-50%, more preferably 0.3-10%, most preferably 0.4-5%.

The alkali metal iodide includes potassium iodide, sodium iodide, cesium iodide, lithium iodide and the like. Preferably potassium iodide and sodium iodide are used. The alkali metal iodide is used 100-1000 mol % to bromine atom in the precursor polymer, preferably 100-500 mol %.

This reaction is usually performed at a temperature of 80° C. to 250° C., preferably 100° C. to 200° C., and more preferably 120° C. to 180° C. The reaction is usually continued for 5 hour to 500 hours, preferably 10 hours to 200 hours.

The polymers having an iodinated arylene as a repeating unit are exemplified by polymers having the following repeating units, wherein m represents the number of repeatings; p, q, r represent the number of 0-2; s represents the number of 0-3. In the following structures, (C-1)-(C-10), the repeating unit may have substitution groups.

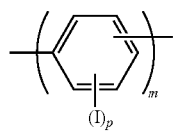
(C-1)

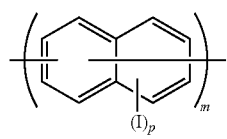
(C-2)

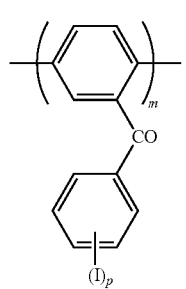
(C-3)

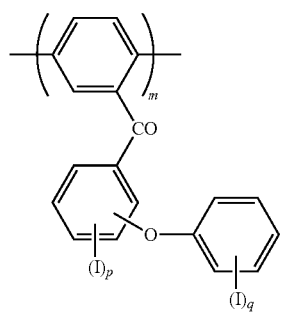
(C-4)

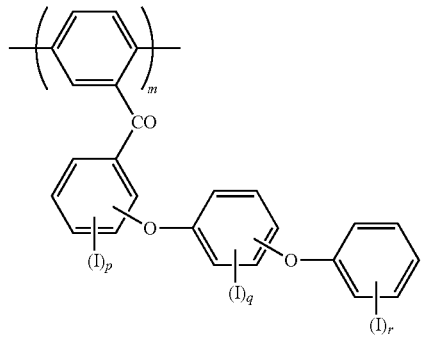
(C-5)

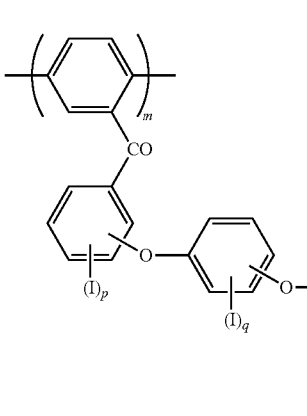
(C-6)

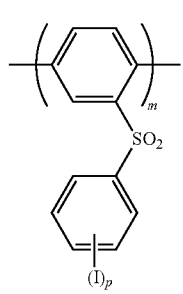
(C-7)

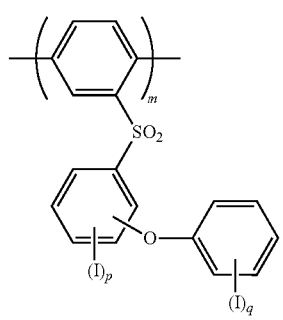
(C-8)

-continued

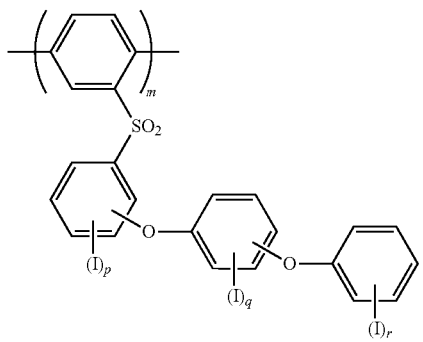

(C-9)

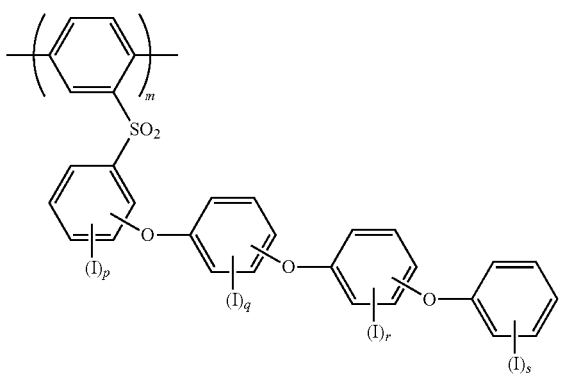

(C-10)

Bromine group may remain on the aromatic rings, however, preferably 10 mol % or above bromine should be replaced with iodine, more preferably 30 mol % or above bromine should be replaced with iodine, most preferably 50 mol % or above bromine should be replaced with iodine.

The ratio of iodine content of the iodinated polymer of the invention is 5 wt % or above, preferably 10 wt % or above, more preferably 15 wt % or above, much more preferably 20 wt % or above, particularly preferably 25 wt % or above, and most preferably 30 wt % or above.

Resulting brominated polyarylenes an iodinated polyarylenes can be reacted with 4-alkoxy-3-(trialkyl stannyl) cyclobut-3-ene-1,2-dione in the presence of transition metal catalysts. The iodinated polyarylenes are preferable due to high reactivity. The 4-alkoxy-3-(trialkylstannyl)cyclobut-3-ene-1,2-dione used here, for example, includes 4-methoxy-3-(trimethylstannyl)cyclobut-3-ene-1,2-dione, 4-methoxy-3-(triethylstannyl)cyclobut-3-ene-1,2-dione, 4-methoxy-3-(tri-n-propylstannyl)cyclobut-3-ene-1,2-dione, 4-methoxy-3-(triisopropylstannyl)cyclobut-3-ene-1,2-dione, 4-methoxy-3-(tri-n-butylstannyl)cyclobut-3-ene-1,2-dione, 4-ethoxy-3-(trimethylstannyl)cyclobut-3-ene-1,2-dione, 4-ethoxy-3-(triethylstannyl)cyclobut-3-ene-1,2-dione, 4-ethoxy-3-(tri-n-propylstannyl)cyclobut-3-ene-1,2-dione, 4-ethoxy-3-(triisopropylstannyl)cyclobut-3-ene-1,2-dione, 4-ethoxy-3-(tri-n-butylstannyl)cyclobut-3-ene-1,2-dione, 4-n-propoxy-3-(trimethylstannyl)cyclobut-3-ene-1,2-dione, 4-n-propoxy-3-(triethylstannyl)cyclobut-3-ene-1,2-dione, 4-n-propoxy-3-(tri-n-propylstannyl)cyclobut-3-ene-1,2-dione, 4-n-propoxy-3-(triisopropylstannyl)cyclobut-3-ene-1,2-dione, 4-n-propoxy-3-(tri-n-butylstannyl)cyclobut-3-ene-1,2-dione, 4-isopropoxy-3-(trimethylstannyl)cyclobut-3-ene-1,2-dione, 4-isopropoxy-3-(triethylstannyl)cyclobut-3-ene-1,2-dione, 4-isopropoxy-3-(tri-n-propylstannyl)cyclobut-3-ene-1,2-dione, 4-isopropoxy-3-(triisopropylstannyl)cyclobut-3-ene-1,2-dione, 4-isopropoxy-3-(tri-n-butylstannyl)cyclobut-3-ene-1,2-dione, 4-n-buthoxy-3-(trimethylstannyl)cyclobut-3-ene-1,2-dione, 4-n-buthoxy-3-(triethylstannyl)cyclobut-3-ene-1,2-dione, 4n-buthoxy-3-(tri-n-propylstannyl)cyclobut-3-ene-1,2-dione, 4-n-buthoxy-3-(triisopropylstannyl)cyclobut-3-ene-1,2-dione, 4-n-buthoxy-3-(tri-n-butylstannyl)cyclobut-3-ene-1,2-dione, 4-t-buthoxy-3-(trimethylstannyl)cyclobut-3-ene-1,2-dione, 4-t-buthoxy-3-(triethylstannyl)cyclobut-3-ene-1,2-dione, 4-t-buthoxy-3-(tri-n-propylstannyl)cyclobut-3-ene-1,2-dione, 4-t-buthoxy-3-(triisopropylstannyl)cyclobut-3-ene-1,2-dione, 4-t-buthoxy-3-(tri-n-butylstannyl)cyclobut-3-ene-1,2-dione, and the like. 4-alkoxy-3-(trialkylstannyl)cyclobut-3-ene-1,2-dione can be synthesized by the reaction of 3,4-dialkyloxy-3-cyclobutene1,2-dione and trialkyl(trialkylstannyl)silane in the presence of catalytic tetraalkyl ammonium cyanide.

The 3,4-dialkyloxy-3-cyclobutene1,2-dione used here, for example, includes 3,4-dimethoxy-3-cyclobutene1,2-dione, 3,4-diethoxy-3-cyclobutene1,2-dione, 3,4-di-n-propoxy-3-cyclobutene1,2-dione, 3,4-diisopropoxy-3-cyclobutene1,2-dione 3,4-di-n-buthoxy-3-cyclobutene1,2-dione, 3,4-di-t-buthoxy-3-cyclobutene1,2-dione, and the like.

The trialkyl(trialkylstannyl)silane used here, for example, includes trimethyl(trimethylstannyl)silane, trimethyl(triethylstannyl)silane, trimethyl(tri-n-propylstannyl)silane, trimethyl(triisopropylstannyl)silane, trimethyl(tri-n-butylstannyl)silane, triethyl(trimethylstannyl)silane, triethyl(triethylstannyl)silane, triethyl(tri-n-propylstannyl)silane, triethyl(triisopropylstannyl)silane, triethyl(tri-n-butylstannyl)silane, tri-n-propyl(trimethylstannyl)silane, tri-n-propyl(triethylstannyl)silane, tri-n-propyl(tri-n-propylstannyl)silane, tri-n-propyl(triisopropylstannyl)silane, tri-n-propyl(tri-n-butylstannyl)silane, triisopropyl(trimethylstannyl)silane, triisopropyl(triethylstannyl)silane, triisopropyl(tri-n-propylstannyl)silane, triisopropyl(triisopropylstannyl)silane, triisopropyl(tri-n-butylstannyl)silane, tri-n-butyl(trimethylstannyl)silane, tri-n-butyl(triethylstannyl)silane, tri-n-butyl(tri-n-propylstannyl)silane, tri-n-butyl(triisopropylstannyl)silane, tri-n-butyl(tri-n-butylstannyl)silane, and the like.

The tetraalkyl ammonium cyanide used here, for example, includes tetramethyl ammonium cyanide, tetraethyl ammonium cyanide, tetra-n-propyl ammonium cyanide, tetra-isopropyl ammonium cyanide, tetra-n-butyl ammonium cyanide, and the like.

The tetraalkyl ammonium cyanide is used 0.1-10 mol % toward 4-dialkyloxy-3-cyclobutene1,2-dione. Preferably 0.2-6 mol % of tetraalkyl ammonium cyanide is used, more preferably 0.3-4 mol % of tetraalkyl ammonium cyanide is used, and most preferably 0.5-3 mol % of tetraalkyl ammonium cyanide is used.

The solvent may be used for the reaction is not limited as long as being unreactive with 3,4-dialkyloxy-3-cyclobutene1,2-dione, trialkyl(trialkylstannyl)silane and tetraalkyl ammonium cyanide. Such solvents include ether solvents such as tetrahydrofuran, 1,3-dioxolane, 1,4-dioxane, 1,3-dioxane, tetrahydropyran, dibutylether, tert-butylmethyl ether, diphenyl ether, and crown ether. Preferable ethers are cyclic ethers such as tetrahydrofuran, 1,3-dioxolane, 1,4-dioxane, 1,3-dioxane, and tetrahydropyran, particularly preferable ethers are tetrahydrofuran and 1,3-dioxolane, and most preferable ether is tetrahydrofuran. The ether solvent may be used together with aliphatic hydrocarbon solvents and/or aromatic hydrocarbon solvents. The aliphatic hydrocarbon solvents include cyclohexane, hexane, heptane, and the like; the aromatic hydrocarbon solvents include benzene, toluene, xylene, and the like.

The 3,4-dialkyloxy-3-cyclobutene1,2-dione and the trialkyl(trialkylstannyl)silane are reacted with a polymer usually at a temperature of −100° C. to 20° C., preferably −80° C. to 10° C., and more preferably −60° C. to 0° C.

A reagent used for a treatment under an acidic condition includes hydrochloric acid, sulfuric acid, nitric acid, acetic acid, trifluoroacetic acid, formic acid, and oxalic acid, and mixtures thereof. A treatment temperature is usually −150° C. to 200° C., preferably −100° C. to 150° C., and more preferably −80° C. to 120° C. A treatment time is usually for 10 minutes to 20 hours, preferably 30 minutes to 15 hours, and particularly preferably 1 hour to 10 hours. The treatment under an acidic condition may be conducted in a homogeneous system or a heterogeneous system. The treated polymer, if being treated in a heterogeneous system, can be collected by filtration; or, if being treated in a homogeneous system, can be collected by filtration after being precipitated in a poor solvent or non-solvent.

Explained as follows is a case of using the polymer of the invention for a diaphragm of electro-chemical devices such as fuel cells.

In this case, the polymer of the invention is usually used in the form of a film; and ways to convert the polymer to a film are not particularly limited, for example, preferably used is a method of forming a film from a solution of the polymer (a solution casting method).

A film is specifically formed by dissolving a polymer in an appropriate solvent, casting the resultant solution on a glass plate, and then removing the solvent. The solvent used for film formation is not particularly limited as long as being able to dissolve a polymer and then be removed: suitably used solvents include non-protonic polar solvents such as N,N-dimethylformamide (DMF), N,N-dimethyl acetamide (DMAc), N-methyl-2-pyrrolidone (NMP), and dimethylsulfoxide (DMSO); chlorine-containing solvents such as dichloromethane, chloroform, 1,2-dichloroethane, chlorobenzene, and dichlorobenzene; alcoholic solvents such as methanol, ethanol, and propanol; alkyleneglycol monoalkyl ether solvents such as ethyleneglycol monomethyl ether, ethyleneglycol monoethyl ether, propyleneglycol monomethyl ether, and propyleneglycol monoethyl ether; and ether solvents such as tetrahydrofuran, 1,3-dioxolane, 1,4-dioxane, 1,3-dioxane, tetrahydropyran, dibutylether, tert-butylmethylether, diphenyl ether, and crown ether. They may be used alone or as a mixture of two or more kinds thereof depending on requirements.

Among them, dimethylsulfoxide, N,N-dimethylformamide, N,N-dimethyl acetamide, N-methylpyrrolidone, tetrahydrofuran, and 1,3-dioxolane are preferable solvent due to their high ability of dissolving a polymer.

A film thickness is not particularly limited, preferably being 10 to 300 μm, and particularly preferably 20 to 100 μm. When the film is thinner than 10 μm, it often does not satisfy a strength for practical usage; and when being thicker than 300 μm, the film resistance is so large that characteristics of electro-chemical devices tend to be decreased. The film thickness can be controlled by a concentration of the solution or a thickness cast on a substrate.

If the polymer after hydrolysis is insoluble in any solvents even though the polymer before hydrolysis is soluble, the membrane can be made before hydrolysis, and then can be hydrolyzed with membrane shape.

For the purpose of improving various properties of the film, plasticizers, stabilizers, mold release agents, and the like which are used for conventional polymers may be added to the polymer of the invention. The polymer of the invention may be alloyed with other polymer by casting a mixture dissolving together with the other polymer in the same solvent, or other ways.

It is known for the fuel cell usage that inorganic or organic fine particles are added as a water retention agent to control water content. Any of such known methods may be applied as long as not violating the object of the invention.

The film may be cross-linked by irradiation of electron beams or radioactive rays in order to enhance mechanical properties thereof. Furthermore, rendering a film complex by impregnating with a porous film or sheet, or mixing it with a fiber or pulp are also known as ways of reinforcing the film; any of these known methods may be applied as long as not violating the object of the invention.

A fuel cell of the invention is explained as follows.

The fuel cell of the invention can be produced by assembling a catalyst and an electro-conductive material as a collector on the opposite faces of a polymer film.

The catalyst is not particularly limited as long as being capable of activating oxidation-reduction reaction of hydrogen atom or oxygen atom, known catalysts can be used, and preferable catalyst is a fine particle of platinum. The fine particle of platinum is often used by being carried on a particle or fibrous carbon such as activated carbon or graphite, which is preferably used.

The electro-conductive material as a collector may use known materials, and porous carbon woven fabrics, carbon nonwoven fabrics or carbon papers are preferable electro-conductive material to effectively transport raw gases to the catalyst.

Assembling a platinum fine particle or a carbon carrying a platinum fine particle with a porous carbon nonwoven fabric or a carbon paper, or further assembling such assembled with a polymer electrolyte film can be performed with known methods such as disclosed in J. Electrochem. Soc.: Electrochemical Science and Technology, 1988, 135(9), 2209.

The polymer of the invention can be also used as a proton conductive material which is one of components of a catalytic composition which composes a catalyst layer of polymer electrolyte membrane fuel cells. Thus produced fuel cell of the invention can be used with various fuel formations such as hydrogen gas, reformed hydrogen gases, methanol, and dimethylether.

While the embodiments of the invention have been described, it is understood that the above disclosed embodiments of the invention are for purposes of illustration and not limitation of the scope of the invention. The scope of the invention is designated with the scope of Claims, and further encompasses all changes which will become possible within meanings and scopes equivalent to the description of the scope of Claims.

EXAMPLES

The invention is explained in detail by referring Examples, but should not be construed to be limited thereto.
Proton Conductivity A proton conductivity was determined with an alternate current method at 80° C. under a relative humidity of 99%.
Ion Exchange Capacity An ion exchange capacity was determined by acid-base back titration.
Chemical Stability Test A membrane was dried and weighed. The membrane was immersed in a 10 ml of Fenton reagent which was comprised of $Fe^{(II)}SO_4 7H_2O$ (149.3 mg, 0.537 mmol) and $H_2O_2$ (3%, 50 ml). The membrane was took out from Fenton reagent and washed with deionized water. The membrane was dried and weighed. Weight remaining ratio was calculated by the following equation.

(Weight remaining ratio, %)=(Weight of after immersion)/(Weight of before immersion)×100

Reference Example 1

Synthesis of 2,5-dichloro-4'-phenoxybenzophenone

A stirred solution of 2,5-dichlorobenzylchloride (10.0 g, 47.74 mmol) and diphenylether (12.5 g, 73.44 mmol) was cooled to 0° C. and 8.5 g of aluminum chloride (63.75 mmol) was added over 15 min and stirring was continued at room temperature for 3 hours. After that the mixture was added to ice water and extracted three times with 50 ml of $CH_2Cl_2$. The organic layer was dried over $MgSO_4$ and the volatile component was removed by evaporator. The remaining material was purified three times by crystallization using 30 ml of cyclohexane to yield 2,5-dichloro-4'-phenoxybenzophenone.

Reference Example 2

Synthesis of poly(4-phenoxybenzoyl-1,4-phenylene)

In a 50 ml round bottom flask, 2,5-dichloro-4'-phenoxybenzophenone (0.515 g, 1.50 mmol) and 2,2'-bipyridine (0.681 g, 4.36 mmol) were dissolved in 20 ml of NMP. The solution was warmed to 60° C., and bis(1,5-cyclooctadiene) nickel(0) (1.00 g, 3.64 mmol) was added to the solution. Stirring was continued for 3 hours and the reaction mixture was added to a solution of 50 ml of methanol and 20 ml of 12 N HCl to precipitate polymer. The crude polymer was washed with methanol and dried to yield poly(4-phenoxybenzoyl 1,4-phenylene).

Reference Example 3

Synthesis of brominated poly(4-phenoxybenzoyl-1,4-phenylene)

In a 200 ml flask, 1.58 g of poly(4-phenoxybenzoyl 1,4-phenylene) was dissolved in 160 ml of dichloromethane. To the solution was added 50.0 g (0.624 mol) of bromine dropwise. Stirring was continued for 20 hours and the reaction mixture was poured into a solution of saturated aqueous $NaHSO_3$. Dichloromethane was removed by evaporator to precipitate brominated polymer. The crude polymer was washed with water and methanol repeatedly and dried to yield 2.71 g of the brominated poly(4-phenoxybenzoyl-1,4-phenylene). Bromine content of this polymer was 44.3 wt %.

Reference Example 4

Synthesis of iodized poly(4-phenoxybenzoyl-1,4-phenylene)

0.300 g of brominated poly(4-phenoxybenzoyl-1,4-phenylene), 20 mg (0.11 mmol) of CuI, 1.05 g (9.04 mmol) of ground KI and 30 mg (0.21 mmol) of rac-trans-N,N'-dimethylcyclohexane-1,2-diamine was dissolved in 10 ml of NMP. Stirring was continued for 20 hours and the solution was added into the mixture of 50 ml of methanol and 50 ml of 12N HCl. The precipitated polymer was purified by the Soxhlet extraction using methanol as solvent. Iodide content of the polymer was 39.4 wt %.

Reference Example 5

Synthesis of poly(4-phenoxybenzoyl-1,4-phenylene) having isopropyl squarate

In a 50 mL flask, iodized poly(4-phenoxybenzoyl-1,4-phenylene) (0.100 g, I: 0.310 mmol) and 4-(1-isopropoxy)-3-(tri-n-butylstannyl)cyclobut-3-ene-1,2-dione (0.266 g, 0.620 mmol, synthesized by the description of Journal of Organic Chemistry, 55, 5359 (1990)) were dissolved in 1.0 mL of NMP. To the stirring solution was added $(PhCH_2)ClPd(PPh_3)_2$ (28.2 mg, 0.0372 mmol) and copper iodide (10.6 mg, 0.0558 mmol) at room temperature. Stirring was continued at 70° C. for 20 h, and the reaction mixture was added into mixture of methanol (100 ml) and 12 N HCl (100 ml). The precipitated polymer was collected by filtration. The polymer was washed with water and methanol thoroughly and dried under vacuum.

Example 1

Synthesis of poly(4-phenoxybenzoyl-1,4-phenylene) having squaric acid and preparation of the membrane To a 50 ml flask was charged poly(4-phenoxybenzoyl-1,4-phenylene) having isopropyl squarate (0.105 g) and HCl (12N, 20 ml). The suspension was stirred at 100° C. for 5 h, and the suspension was filtered and washed with water thoroughly. The hydrolyzed polymer was dried to afford the product polymer (Polymer A). After preparing a solution of the Polymer A using N,N-dimethylacetamide, the solvent was removed to obtain a Membrane A. Properties of the Membrane A were investigated and summarized in Table 1.

Comparative Example 1

Synthesis of poly(4,4'-biphenyleneoxy-4,4'-diphenylsulfone) having squaric acid and preparation of the membrane A stirred solution of poly(4,4'-biphenyleneoxy-4,4'-diphenylsulfone) (1.00 g, 2.5 mmol (the number of moles of repeating unit)) in 120 ml of 1,3-dioxolane was cooled to −78° C. and 10.0 mmol of butyllithium (4.0 ml of a 2.5 M solution) was added dropwise and stirring was continued at −78° C. for 60 min (solution J). In a separate flask, 2.4 g (12.1 mmol) of diisopropyl squarate was dissolved in 20 ml of 1,3-dioxolane, cooled to −78° C. and 1.8 mmol of phenyl lithium (1.0 ml of a 1.8 M dibutylether solution) was added to quench the acidic impurity (solution K). The solution J was cannulated into the solution K. Stirring continued at −78° C. for 3 h and quenched with 5 ml of 2N—HCl at −78° C. Approximately three quarters of the solvent was removed under reduced pressure and the remaining solution was added to 300 ml of 2N—HCl to precipitate crude polymer. The polymer was filtered and washed thoroughly with water and dried. The polymer was dissolved in 20 ml of DMF and poured into 2N—HCl to precipitate the purified polymer. The polymer was dried at room temperature to yield 0.90 g of isopropyl squarate formed polymer (polymer E').

In a 100 ml round bottomed flask, 0.90 g of the polymer E' and 20 ml of concentrated HCl (12 N) were stirred at 100° C. for 6 h to hydrolyze isopropoxy group. The polymer was filtered, washed thoroughly with deionized water and dried at ambient temperature to yield the polymer bearing squaric acid groups (Polymer E). After preparing a solution of the Polymer E using 1,4-dioxane, the solvent was removed to obtain a Membrane E. Properties of the Membrane E were investigated and summarized in Table 1.

TABLE 1

Properties of the membranes

| | Ion exchange capacity (meq/g) | Weight before test (mg) | Weight after test (mg) | Weight remaining ratio (%) |
|---|---|---|---|---|
| Example 1 (Membrane A) | 2.65 | 50.0 | 47.7 | 95.4 |
| Comparative Example (Membrane E) | 2.65 | 200 | 144 | 72.1 |

INDUSTRIAL APPLICABILITY

The polymer having more than 3.0 meq/g of oxocarbon groups of the invention has high proton conductivity and it is useful for a polymer electrolyte which is an ingredient of proton conductive membrane for polymer electrolyte membrane fuel cells which use gaseous fuels such as hydrogen gas or liquid fuels such as methanol and dimethylether.

The invention claimed is:

1. A polymer having an oxocarbon group represented by the following formula (1)

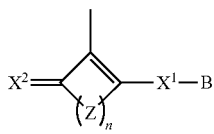

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

2. The polymer according to claim 1, wherein the polyarylenes have the structure represented by following formula (2)

(2)

wherein $R_1$-$R_4$ are substitutional groups or H and m is 6 or greater.

3. The polymer according to claim 1, wherein $R_1$ is benzoyl group or its derivatives.

4. The polymer according to claim 1, wherein Z is selected from the group consisting of —CO—, —C(S)—, and —C(NR)—.

5. The polymer according to claim 1, wherein $X^1$ and $X^2$ are —O-s, Z is —CO—, and n is 0 to 2.

6. A polymer electrolyte including a polymer having an oxocarbon group represented by the following formula (1)

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

7. A polymer electrolyte membrane including a polymer electrolyte comprising a polymer having an oxocarbon group represented by the following formula (1)

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

8. A catalytic composition including a polymer electrolyte comprising a polymer having an oxocarbon group represented by the following formula (1)

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

9. A polymer electrolyte membrane-electrode assembly including a polymer electrolyte comprising a polymer having an oxocarbon group represented by the following formula (1)

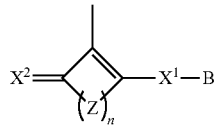

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

10. A polymer electrolyte membrane fuel cell including a polymer electrolyte comprising a polymer having an oxocarbon group represented by the following formula (1)

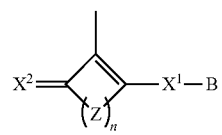

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom; and having polyarylenes in the main chain.

\* \* \* \* \*